US012597016B2

(12) United States Patent
Sampath

(10) Patent No.: US 12,597,016 B2
(45) Date of Patent: Apr. 7, 2026

(54) SYSTEMS AND METHODS FOR PERFORMING A SECURE ELECTRONIC TRANSACTION USING A HOSTED SERVICE

(71) Applicant: Worldpay, LLC, Symmes Township, OH (US)

(72) Inventor: Raman Sampath, Symmes Township, OH (US)

(73) Assignee: Worldpay, LLC, Symmes Township, OH (US)

( * ) Notice: Subject to any disclaimer, the term of this patent is extended or adjusted under 35 U.S.C. 154(b) by 860 days.

(21) Appl. No.: 16/808,530

(22) Filed: Mar. 4, 2020

(65) Prior Publication Data

US 2025/0252427 A1     Aug. 7, 2025

(51) Int. Cl.
| | |
|---|---|
| *G06Q 20/36* | (2012.01) |
| *G06F 21/62* | (2013.01) |
| *G06Q 10/00* | (2023.01) |
| *G06Q 20/38* | (2012.01) |
| *G06Q 40/04* | (2012.01) |
| *G06Q 50/26* | (2012.01) |
| *H04L 9/32* | (2006.01) |
| *H04L 9/40* | (2022.01) |
| *G06Q 20/40* | (2012.01) |

(52) U.S. Cl.
CPC ..... *G06Q 20/3674* (2013.01); *G06F 21/6254* (2013.01); *G06Q 50/26* (2013.01); *H04L 9/3213* (2013.01); *H04L 63/0853* (2013.01); *G06Q 20/4012* (2013.01); *G06Q 2220/00* (2013.01)

(58) Field of Classification Search
CPC ....... G06Q 20/3674; G06Q 20/00–425; G06Q 50/00–60; G06Q 2220/00–18; G06F 21/00–88; H04L 9/00–50; H04L 63/00–308
USPC ......................................................... 705/67
See application file for complete search history.

(56) References Cited

U.S. PATENT DOCUMENTS

| | | | | |
|---|---|---|---|---|
| 8,459,560 B1 * | 6/2013 | Mineo-Goggin | ............................ G06Q 20/3223 235/487 |
| 8,794,517 B1 * | 8/2014 | Templeton | .............. H04L 69/22 235/487 |
| 10,552,834 B2 * | 2/2020 | Dimmick | .............. G06Q 20/382 |
| 2003/0094489 A1 * | 5/2003 | Wald | ...................... G07C 13/00 235/386 |
| 2005/0288996 A1 * | 12/2005 | Wallman | ................ G06Q 40/00 705/12 |

(Continued)

*Primary Examiner* — Chenyuh Kuo
(74) *Attorney, Agent, or Firm* — Bookoff McAndrews, PLLC

(57) ABSTRACT

Systems and methods are disclosed for performing an electronic transaction using a hosted transaction page. One method comprises providing a hosted transaction page to a first data system, the hosted transaction page enabling the first data system to request an electronic transaction. Via the hosted transaction page, authentication data may be received from a user. The received authentication data may be encoded into a first format and tokenized into tokenized authentication data. The tokenized authentication data may then be transmitted to the first data system. An authorization request for performing the electronic transaction based on the tokenized authentication data may be received from the first data system, then transmitted to a second data system.

20 Claims, 5 Drawing Sheets

(56) References Cited

U.S. PATENT DOCUMENTS

| | | | |
|---|---|---|---|
| 2014/0244356 A1* | 8/2014 | Boniello | G06Q 30/0202 |
| | | | 705/7.31 |
| 2014/0244456 A1* | 8/2014 | Huang | G06Q 40/123 |
| | | | 705/31 |
| 2015/0262140 A1* | 9/2015 | Armstrong | G06Q 20/065 |
| | | | 705/41 |
| 2016/0330190 A1* | 11/2016 | Cho | G06F 21/31 |
| 2017/0024133 A1* | 1/2017 | Bushman | G06F 3/0664 |
| 2017/0109735 A1* | 4/2017 | Sheng | H04L 9/3297 |
| 2017/0200150 A1* | 7/2017 | Cohn | G06Q 20/401 |
| 2020/0252386 A1* | 8/2020 | Benkreira | H04L 63/0807 |
| 2020/0274861 A1* | 8/2020 | Black | G06N 5/046 |
| 2020/0351852 A1* | 11/2020 | McConnell | G06F 9/5011 |
| 2020/0366656 A1* | 11/2020 | Barnett | H04L 67/02 |

* cited by examiner

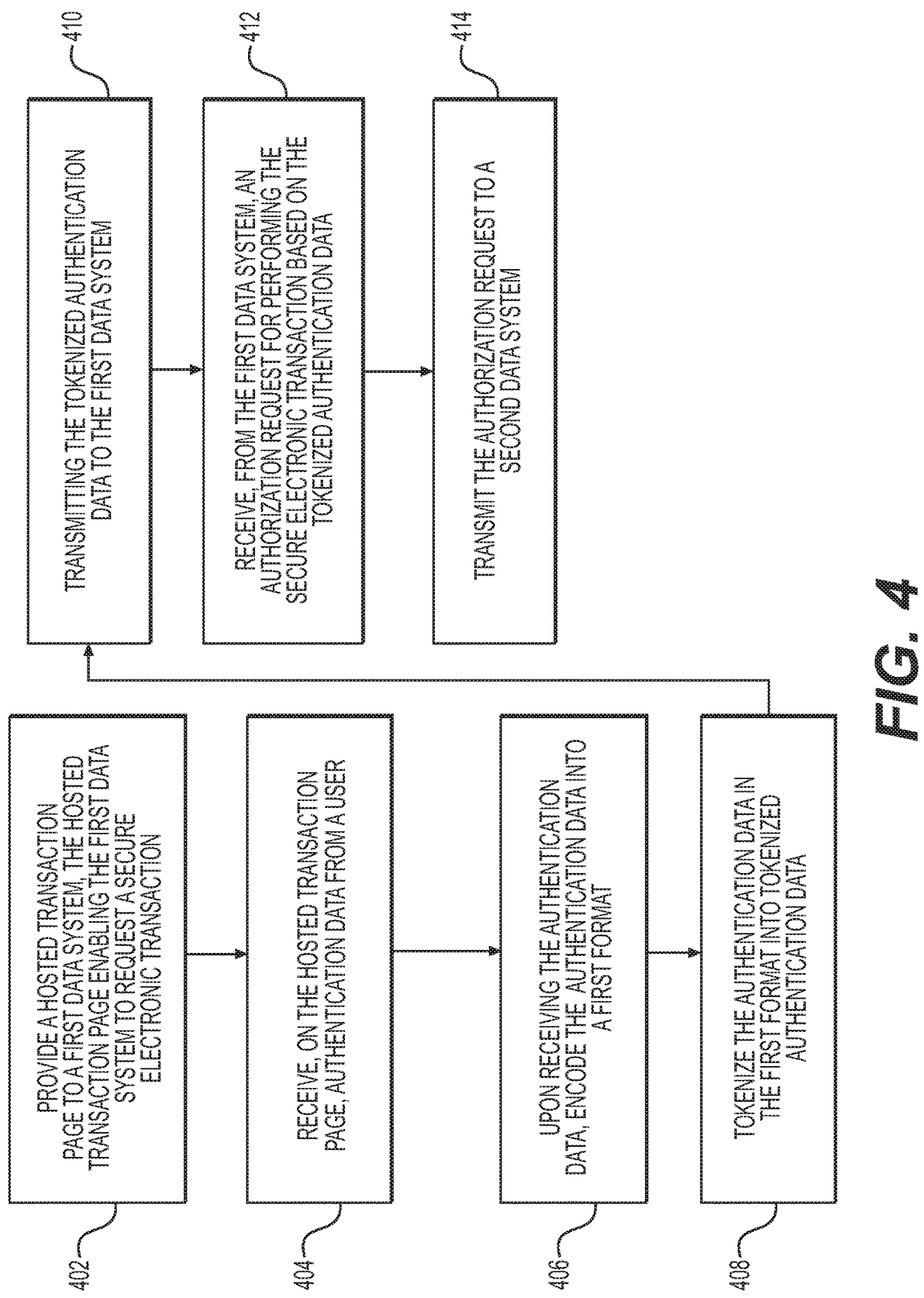

410 — TRANSMITTING THE TOKENIZED AUTHENTICATION DATA TO THE FIRST DATA SYSTEM

412 — RECEIVE, FROM THE FIRST DATA SYSTEM, AN AUTHORIZATION REQUEST FOR PERFORMING THE SECURE ELECTRONIC TRANSACTION BASED ON THE TOKENIZED AUTHENTICATION DATA

414 — TRANSMIT THE AUTHORIZATION REQUEST TO A SECOND DATA SYSTEM

402 — PROVIDE A HOSTED TRANSACTION PAGE TO A FIRST DATA SYSTEM, THE HOSTED TRANSACTION PAGE ENABLING THE FIRST DATA SYSTEM TO REQUEST A SECURE ELECTRONIC TRANSACTION

404 — RECEIVE, ON THE HOSTED TRANSACTION PAGE, AUTHENTICATION DATA FROM A USER

406 — UPON RECEIVING THE AUTHENTICATION DATA, ENCODE THE AUTHENTICATION DATA INTO A FIRST FORMAT

408 — TOKENIZE THE AUTHENTICATION DATA IN THE FIRST FORMAT INTO TOKENIZED AUTHENTICATION DATA

FIG. 4

SYSTEMS AND METHODS FOR PERFORMING A SECURE ELECTRONIC TRANSACTION USING A HOSTED SERVICE

TECHNICAL FIELD

The present disclosure relates generally to the field of secure network transactions and, more particularly, to systems and methods for performing secure online electronic transactions.

BACKGROUND

Electronic Benefits Transfer (EBT) is an electronic system that allows benefit recipients to request transfer of government benefits from a Federal account to a retailer account to pay for products received. An EBT benefit recipient can make purchases at point of sale (POS) devices of an authorized store by swiping an issued EBT card (e.g., a personal identification number (PIN)-based debit card) and entering a multi-digit PIN.

With increasing demands for online purchases, the regulating entity for EBT (i.e., Food and Nutrition Service (FNS), which is part of Food and Drug Administration (FDA)) has launched a program for providing access to the EBT benefit recipients for making online purchases. As part of ensuring data security for online EBT transactions, EBT payment networks may require a Payment Card Industry (PCI)-compliant method of encrypted PIN entry. Thus, in order for merchants to participate in online EBT transactions, the merchants may have to comply with certain online EBT transaction requirements.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a method for performing an electronic transaction using a hosted transaction page, comprising: providing the hosted transaction page to a first data system, the hosted transaction page enabling the first data system to request an electronic transaction; receiving, via the hosted transaction page, authentication data from a user; upon receiving the authentication data, encoding the authentication data into a first format; tokenizing the authentication data in the first format into tokenized authentication data; transmitting the tokenized authentication data to the first data system; receiving, from the first data system, an authorization request for performing the electronic transaction based on the tokenized authentication data; and transmitting the authorization request to a second data system.

One embodiment provides a system comprising: one or more computer readable media storing instructions for performing an electronic transaction using a hosted transaction page; and one or more processors configured to execute the instructions to perform operations comprising: providing the hosted transaction page to a first data system, the hosted transaction page enabling the first data system to request an electronic transaction; receiving, via the hosted transaction page, authentication data from a user; upon receiving the authentication data, encoding the authentication data into a first format; tokenizing the authentication data in the first format into tokenized authentication data; transmitting the tokenized authentication data to the first data system; receiving, from the first data system, an authorization request for performing the electronic transaction based on the tokenized authentication data; and transmitting the authorization request to a second data system.

One embodiment provides a non-transitory computer-readable medium storing instructions for performing an electronic transaction using a hosted transaction page, the instructions, when executed by one or more processors, causing the one or more processors to perform operations comprising: providing the hosted transaction page to a first data system, the hosted transaction page enabling the first data system to request an electronic transaction; receiving, via the hosted transaction page, authentication data from a user; upon receiving the authentication data, encoding the authentication data into a first format; tokenizing the authentication data in the first format into tokenized authentication data; transmitting the tokenized authentication data to the first data system; receiving, from the first data system, an authorization request for performing the electronic transaction based on the tokenized authentication data; and transmitting the authorization request to a second data system.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 4 depicts a flowchart of an exemplary method of performing electronic payment transaction, according to one aspect of the present disclosure.

DETAILED DESCRIPTION OF EMBODIMENTS

Figure 1:
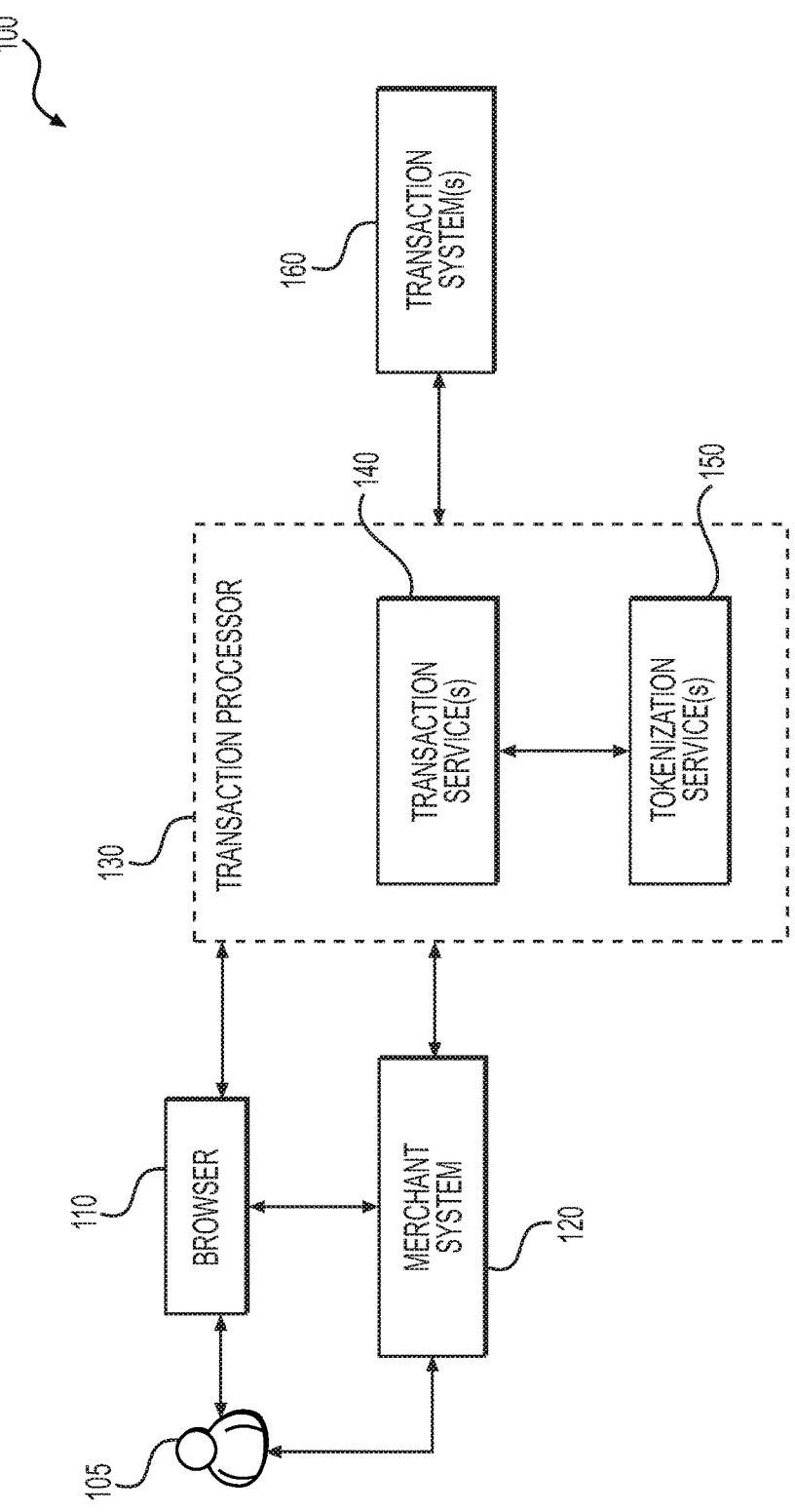
FIG. 1 depicts a block diagram of an exemplary electronic payment system, according to one aspect of the present disclosure.

The following embodiments describe systems and methods for securely facilitating electronic transactions. More particularly, the embodiments contemplated in the present disclosure may enable merchants to utilize a hosted service provided by a transaction processor, which is configured to perform tokenization of sensitive user data in order to securely facilitate electronic purchase transactions.

To perform an online EBT payment transaction, merchants may be required to adhere to specific standards and formats for requesting online purchase authorizations. That is, in order for a merchant to process an online EBT purchase transaction, EBT payment networks may require the merchant to gather and transmit sensitive user data in specific formats. For example, a personal account number (PAN) may need to be in clear text and a PIN may need to be encrypted. It may be cumbersome for merchants to update and re-integrate their systems to meet new requirements associated with online EBT payment support. In addition, as transferring sensitive user data over the Internet may leave the merchants vulnerable to data breaches, additional security features may be desired to prevent exposure and/or loss of sensitive data.

To address the above-noted problem, the present disclosure contemplates providing a hosted service and a tokenization service, which may allow merchants to securely perform electronic payment transactions. A transaction processor may be provided with a hosted service, which may provide a hosted transaction page for capturing sensitive user data (e.g., PAN and PIN). The transaction processor may also provide a tokenization service by tokenizing the captured sensitive user data. The hosted transaction page may include embedded frames that may capture sensitive user data. For example, when a user enters sensitive data on the hosted transaction page of a merchant to make an online purchase, the hosted transaction page may encrypt the sensitive user data. The sensitive user data encrypted by the hosted transaction page may then be tokenized by the transaction processor into a high value token and/or a low value token, and may be sent to the merchant (i.e., merchant system). For example, a low value token (i.e., a controlled or limited-use token such as, e.g., a token that is usable for a predetermined amount of time) may be generated based on the PIN and PAN. When the user confirms the purchase on the hosted transaction page of the merchant, the merchant may transmit an authorization request along with the tokenized sensitive user data, back to the transaction processor. The transaction processor may then redeem (i.e., detokenize) the tokenized sensitive user data and send a detokenized sensitive user data to a payment network (e.g., an EBT payment network). The detokenized sensitive user data, which may comprise a PIN and a PAN, may be in a format that is acceptable by the payment network. For example, the PAN may be sent in clear text and the PIN may be sent as an encrypted PIN by the transaction processor. The transaction processor may also return a high value token generated based on the sensitive user data (e.g., a PIN and a PAN) to the merchant, so that the merchant may store the token for future use.

It should be appreciated that particular consideration is made herein to debit and credit card transactions due to the prevalence of these transactions. Despite this reference to debit and credit cards, certain disclosed systems and methods may apply equally well to the transfer of any sensitive data, whether "card present" or "card not present" (CNP). Disclosed systems and methods may apply, for example, in online transactions where a user is not physically present at a merchant location. Transactions may include EBT online transactions, EBT card transactions, debit or credit card transactions, gift card transactions, PayPal transactions, Bit-Coin transactions, smart card transactions, mobile application transactions, and transactions involving loyalty cards, to name a few. Effectively, any circumstance where sensitive data, such as a PAN, a PIN, a social security number, etc., or a token corresponding thereto, is being transmitted over a network, systems and methods disclosed herein may be employed. Further, while the party seeking to initiate a secure transaction and/or provide a third-party service may be referred to herein as a "merchant," a party seeking to initiate a secure transaction need not be a merchant, but may be a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts a system 100 with a merchant system 120, such as a merchant point of sale (POS) system(s), terminal(s), and/or server, that may receive consumer payment information (e.g., a payment vehicle such as an electronic benefits card, credit/debit card, gift card, etc.) from a user 105. The merchant system 120 may transfer the consumer payment information securely to a transaction system(s) 160, which may include payment systems or network(s) (e.g., EBT systems or networks, issuer systems, acquirer systems, etc.), via an intermediary such as a transaction processor 130. A user 105 may provide sensitive data directly, such as at a POS terminal at a retail location, or via, for example, remotely via a user browser 110 (or browser). The user browser 110 may interact with the merchant system 120, and may also directly communicate with the transaction processor 130. The user browser 110 may be a client-side browser on a user computing device, but may also be a client-side app (e.g., Apple Pay, Google Wallet, etc.), or any other type of software or application on a client-side data processor. The user browser 110 may display a secure transaction page for the user 105, which may comprise a secure page hosted by the transaction processor 130. In another embodiment, the secure transaction page may comprise a page hosted by the merchant system 120, with an embedded frame (e.g., iFrame) or other embedded web component hosted by the transaction processor 130. Sensitive user data (e.g., a PAN, a PIN, a credit card number, a social security number, etc.) may be collected by an embedded frame, such as an iFrame. A frame is part of a web page that displays content independent of its container, with the ability to load content independently. For example, a webpage of a merchant may host a frame embedding a page provided from the transaction processor 130. Using frames or pages hosted by the transaction processor 130, merchants and other secure transaction providers may avoid having sensitive data entered into their own systems, thereby enhancing security and reducing the risk of fraud. While the term "merchant" is used herein, techniques provided herein may be used with any secure transaction provider. Further, while the term "secure transaction page" may be used herein, this term may encompass more than one page, or one or more elements or sub-portions of an electronic or network page.

The merchant system 120 may comprise a payment terminal and/or a data server configured to host a merchant's e-commerce store. The transaction processor 130, such as a payment processor, may be an intermediary in the system 100 to ensure validity of an electronic payment request, and may generate a token via a tokenization service(s) 150. A token may be a low-value token or a high-value token. In one embodiment, a token may be a randomly generated number. In other embodiments, a token may be a pseudo-random number, encrypted information, or other character sequence. The transaction processor 130 may transmit an electronic payment request (e.g., an authorization request) to the transaction system(s) 160 and receive a response indicating a result of the electronic payment request (e.g., an authorization response). For example, when the merchant system 120 transmits an authorization request for an online purchase transaction, the transaction processor 130 may act as an intermediary for the merchant system 120 and transmit the authorization request to the transaction system(s) 160. The transaction processor 130 may also receive an authorization response with a result of the authorization request from the transaction system(s) 160, and may transmit the authorization response to the merchant system 120 and/or may complete or decline the electronic payment transaction based on the authorization response.

The transaction processor 130 may also transmit a token generated by the transaction processor 130 together with the authorization response to the merchant system 120, such that the merchant system 120 may store the token for future transactions. The token may be unique per transaction, per user, and/or per merchant or organization. Thus, if a given user makes a purchase at merchant A, token A may be generated, but if the user makes a purchase at merchant B, even if the same payment vehicle is used, token B may be generated. By utilizing a token, the merchant system 120 may not need to send debit or credit card information or other sensitive data for subsequent transactions, and may instead use the token. For example, in a card-not-present context, an online merchant may run multiple transactions for a recurring web subscription using one or more tokens. Therefore, tokenization may enhance data security as well as merchants' convenience in processing subsequent electronic transactions.

Figure 2:
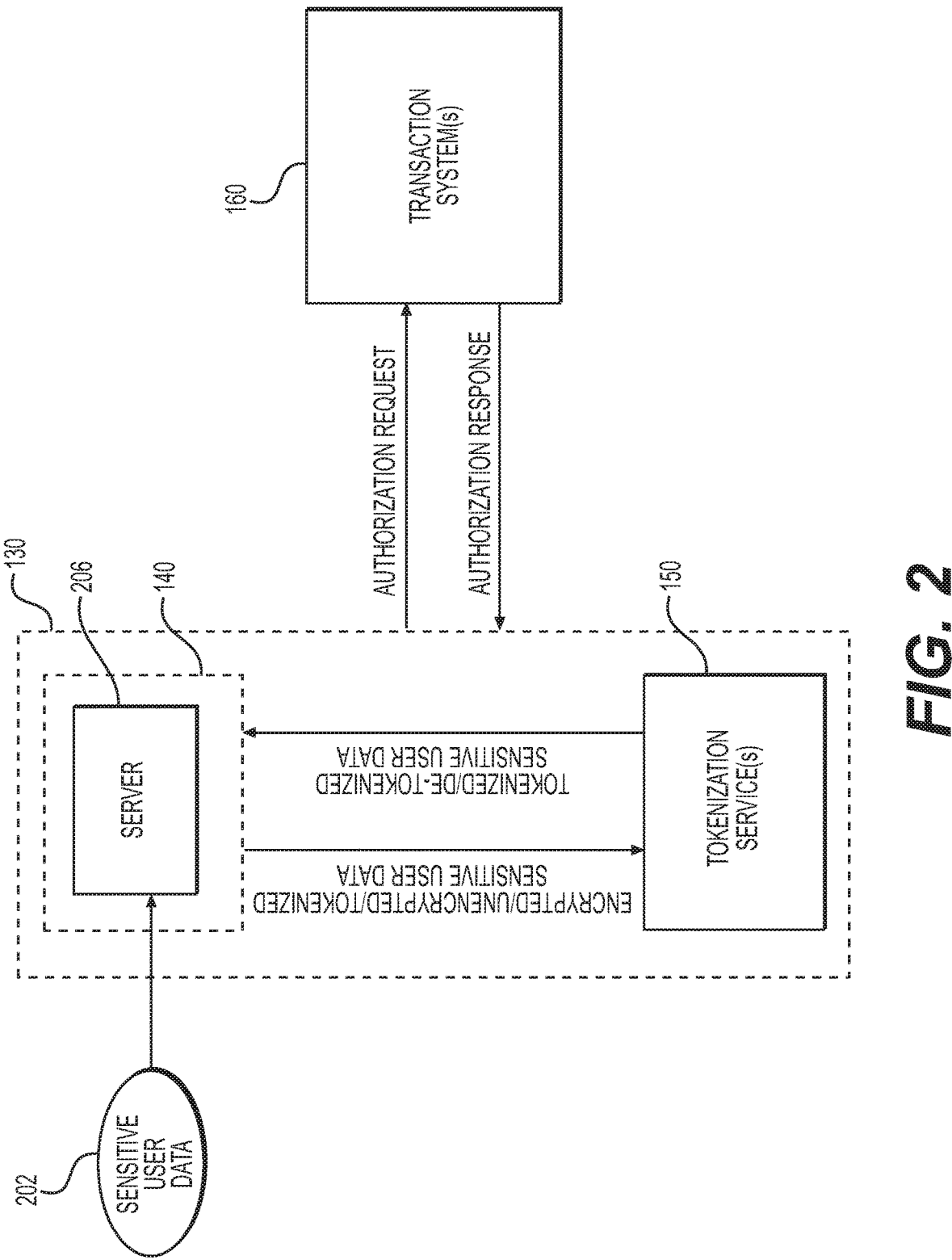
FIG. 2 depicts a block diagram of a portion of an exemplary electronic payment system utilizing a tokenization service, according to one aspect of the present disclosure.

FIG. 2 is a block diagram of a portion of an exemplary electronic payment system utilizing a tokenization service. Specifically, the portion depicted in FIG. 2 represents a more detailed view of the transaction processor 130, to better illustrate the tokenization process performed by the transaction processor 130. In one embodiment, a user, such as a customer or purchaser, may interact with a merchant and/or a user browser to initiate a transaction to pay for a good or service. In an e-commerce environment, the user may input sensitive user data 202, such as a debit or credit card account number (e.g., a PAN) or other sensitive data (e.g., a PIN, a social security number, etc.), in appropriate field(s) on a web page via the user browser. The transaction service(s) 140, such as payment service(s), in the transaction processor 130 may receive the sensitive user data 202 entered by the user.

The sensitive user data 202 may be encrypted, unencrypted, and/or tokenized. Data transfer may occur over a telecommunications network, for example, the Internet, or via any type of communication network. Transaction service(s) 140 may comprise a plurality of systems, including a server 206 (e.g., eProtect server) for receiving and storing the sensitive user data 202. The transaction service(s) 140 may perform an initial check to determine where the received data 202 is encrypted. If the received data 202 is not encrypted, the received data may be transferred promptly to transaction system(s) 160 for further electronic transaction processing. However, where encryption is present and/or tokenization is desired, the transaction service(s) 140 may transfer the received data 202 to the tokenization service 150. The transaction service(s) 140 may validate the encrypted block, encrypted key, and/or reader serial number lengths. It may also validate the merchant's ID with a stored database of terminal IDs.

The tokenization service(s) 150 may further validate credentials and identify keys for the encrypted data. The tokenization service(s) 150 may also be configured to tokenize or detokenize the encrypted sensitive user data 202, as will be discussed in greater detail below. Tokens might not themselves contain any sensitive data, but rather merely correspond to sensitive identification data such as a PAN, PIN, social security number, account information, or other sensitive financial data, such as cardholder data. In some embodiments, the tokenization service(s) 150 may store a mapping between token values and sensitive user data corresponding to the token values. The sensitive user data 202 may be stored securely at the server 206 of the transaction processor 130 or elsewhere.

In some embodiments, the tokens may also include an expiration date. Any expiration date of the token, if present, may be varied depending on whether the token is designated as a single use token or as a token for recurring transactions (i.e., a subscription). For example, different expiration periods may be applied to single use and recurring tokens, which may allow recurring tokens to be used by the merchant for a longer period of time, and which may also ensure that single use tokens are stored or usable only for a predetermined amount of time.

The transaction processor 130 may facilitate communication between the merchant (i.e., merchant system 120) and the transaction system(s) 160 by transmitting authorization requests from the merchant to the transaction system(s) 160. The transaction processor 130 may also transmit authorization responses to the merchant, the authorization responses having been generated by the transaction system(s) 160 based on authorization requests from the merchant. This process will be discussed in greater detail below.

In one embodiment, a token (e.g., a low-value token or high-value token generated based on PIN and/or PAN) and/or clear text of sensitive user data 202 (e.g., a PAN in clear text) may be sent to the tokenization service(s) 150, along with an authorization request generated by the merchant. The token and/or the clear text of sensitive user data 202, along with the authorization request, may subsequently be sent to the transaction service(s) 140. The transaction service 140 may transfer the clear text of sensitive user data 202 (e.g., a PAN in clear text) and/or encrypted sensitive user data 202 (e.g., an encrypted PIN) along with any authorization request to the transaction system(s) 160 for an authorization response. The authorization response may then be transmitted to the merchant along with the token. The merchant may then store the token for later transactions.

Figure 3:
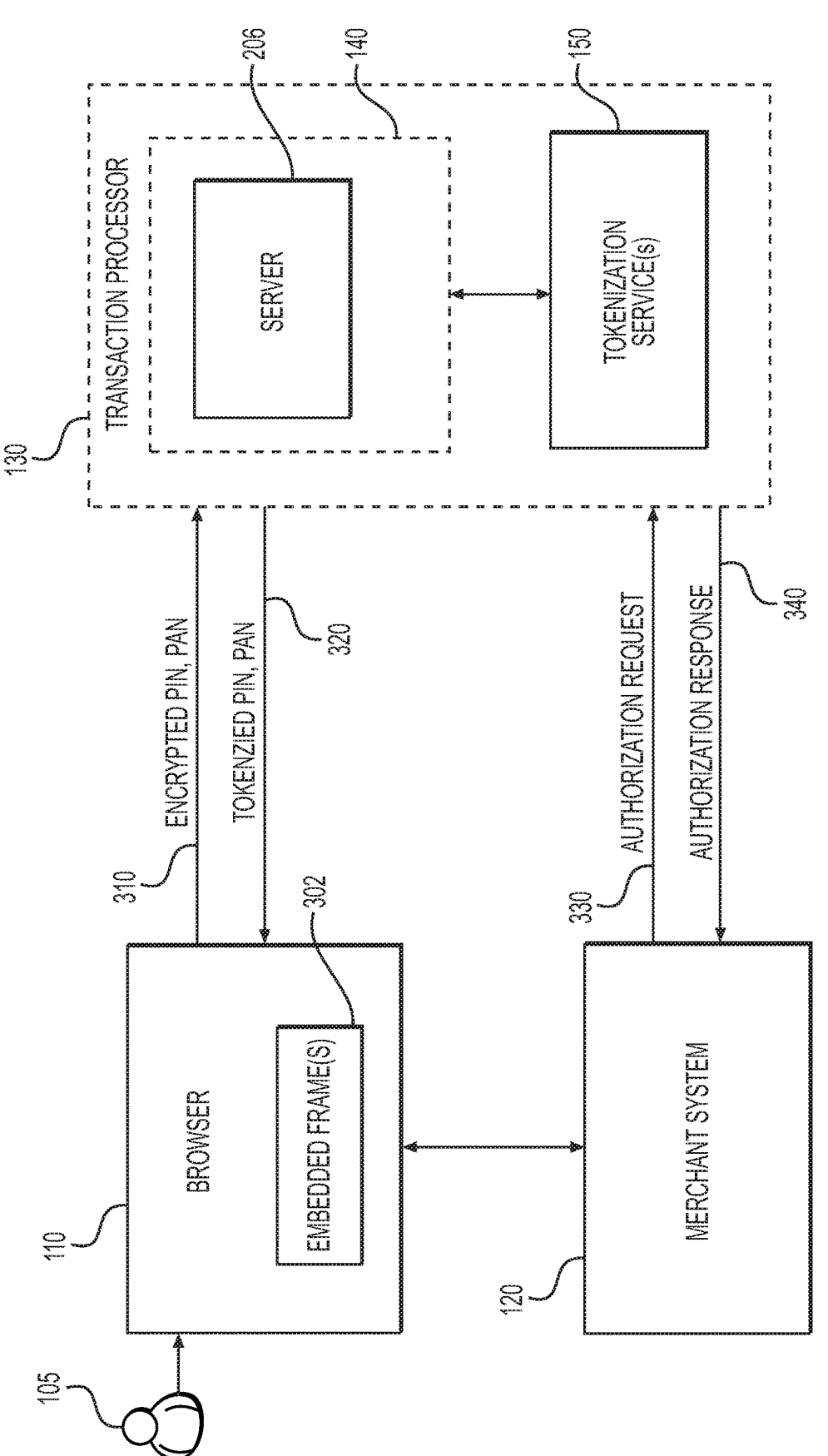
FIG. 3 depicts a block diagram of a portion of an exemplary electronic payment system utilizing a hosted transaction page and a tokenization service, according to one aspect of the present disclosure.

FIG. 3 is a block diagram of a portion of an exemplary electronic payment system utilizing a hosted transaction page and a tokenization service. The portion in FIG. 3 represents a more detailed view of components within the system 100, to better illustrate how an online transaction may be processed utilizing tokens. In one aspect, the process flow in FIG. 3 may illustrate a scenario where a user initiates a card-not-present (CNP) transaction using, for example, the browser 110. As explained above, the browser 110 may be a merchant browser with one or more hosted pages having one or more embedded frames 302 (e.g., iFrames). Sensitive user data (e.g., a PAN, a PIN, a credit card number, a social security number, etc.) may be entered into one or more fields in the embedded frames 302 by the user 105. The sensitive user data entered by the user 105 may be encrypted by the embedded frames 302 using JavaScript, for example, with a 24-hour or a one-time use, whichever event comes first, public-private key pair (e.g., Rivest, Sharmir, and Adelman/ Electronic Code Book/Public Key Cryptography Standards (RSA/ECB/PKCS1) Padding 2048 bits) known only by the transaction processor 130. The embedded frames 302 may capture each type of sensitive user data separately. For example, a PIN and a PAN may be captured and transmitted one at a time separately by the embedded frames 302.

At step 310, the encrypted data (e.g., encrypted PIN and PAN) from the user browser 110 may be transmitted to the transaction processor 130, such as to the transaction service 140. It should be noted that the encrypted data transmitted from the browser 110 to the transaction processor 130 may not be limited to the PIN and PAN pair described explicitly herein, but may comprise any suitable data (e.g., one or more types of sensitive user data) for validating the electronic payment transaction. The encrypted data may be transmitted via, for example, a dial-up access connector or Internet data connection, through which data may pass via network sockets and/or web services. For example, the encrypted data may be transmitted via, for example, HyperText Transfer Protocol Secure/Transport Layer Security (HTTPS/TLS) version 1.2 (e.g., using GeoTrust Global Certificate Authority (CA) and Secure Hash Algorithm (SHA)-1 with RSA 2048 bit encryption) through a third party content delivery network (CDN) by using an HTTPS GET request. Any type of data connection may be established for data transfer purposes. Incoming data may be provided to the server 206 in the transaction processor 130. Various types of servers (e.g., a RAFT server) may be included in order to handle any data input. For example, in some embodiments where EBT cards, gift cards or loyalty cards are being processed, the system 100 may include an EBT card server, gift card server or loyalty card server. The system 100 may be scalable to take any number of payment types, as is desirable for any particular scenario.

The server 206 may determine whether a token is present and/or if data is encrypted. If the data is not encrypted (e.g., data in clear text) and the merchant is not set up for tokenization, the clear text data (e.g., PIN or PAN in clear text) may be transferred to the transaction system(s) 160 to tokenize the clear text data in the form appropriate for the electronic transaction approval process. Otherwise, if the data includes a token or encrypted data, or if tokenization is otherwise requested or required, the data may be provided to the tokenization service(s) 150 as previously discussed. The tokenization service(s) 150 may tokenize the encrypted data (e.g., encrypted PIN and PAN), for example, into low value tokens or high value tokens. The low value tokens may have a relatively short expiration date, for example, 24 hours, compared to high value tokens. Any expiration date of the tokenized PIN and PAN, if present, may be varied depending on whether the token is designated as a single use token or as a token for recurring transactions (i.e., a subscription). As an example, a one-day and two-year expiration may be provided for single use and recurring tokens, respectively. In some embodiments, a RAFT Network Tokenization Service (NTS) or a Simple Object Access Protocol (SOAP) based Exchange Web Service (EWS) may be utilized to perform the tokenization.

At step 320, upon tokenizing the encrypted data by the tokenization service(s) 150, the transaction processor 130 may send the tokenized encrypted data (e.g., tokenized PIN and PAN) to the browser 110. The transaction processor 130 may also store the tokenized encrypted data for further processing. However, in some embodiments, the stored tokenized encrypted data may be deleted upon completion of the electronic transaction. After receiving the tokenized PIN and PAN, the browser 110 may transmit the tokenized PIN and PAN to the merchant system 120 in order to complete the transaction (e.g., an electronic purchase transaction). For example, the tokenized PIN and PAN may be transmitted to the merchant system 120 when the user 105 presses a submit button on the browser, confirming an online purchase. The user 105 may confirm online purchases through any suitable method using the browser 110. In some embodiments, the fields in the embedded frames 302 where the PIN and PAN are entered may be updated and displayed with tokenized encrypted data values, before the user 105 confirms the online purchase on the browser 110. For example, the fields may be masked by the encrypted PIN and PAN before being displayed to the user 105. The merchant system 120 may store the received tokenized PIN and PAN, and may use the tokenized PIN and PAN for additional transactions until they expire.

At step 330, the merchant system 120 may transmit an authorization request for completing the online purchase transaction to the transaction processor 130. The authorization request may comprise, for example, any received and/or stored tokenized PIN and PAN (i.e., one or more tokens) and/or any encrypted or unencrypted data necessary to complete the purchase transaction. When the authorization request is received at the transaction processor 130, the tokenization service(s) 150 may redeem or verify the tokenized PIN and PAN by comparing them with the previously stored tokenized PIN and PAN in the server 206 in the similar manner the PIN and PAN tokenization and encryption process are performed. The tokenization service(s) 150 may also detokenize the tokenized PIN and PAN into any suitable format (e.g., a PAN in clear text and a PIN in encrypted format) accepted by the payment network (e.g., EBT payment network) for authorizing the purchase transaction. The transaction processor 130 may then transmit the detokenized PIN and PAN along with the authorization request to a transaction system (e.g., transaction system 160). The transaction system may process the authorization request, for example, by communicating with a payment network (e.g., EBT payment network), issuing systems, and/or acquiring systems, to generate and transmit an authorization response to the transaction processor 130. At step 340, upon receiving the authorization response from the transaction system, the transaction processor 130 may route the authorization response to the merchant system 120. In some embodiments, the transaction processor 130 may transmit, along with the authorization response, a high value token of the sensitive user data (e.g., high value token(s) generated based on the PIN and/or PAN) or a low value token of the sensitive user data to the merchant system 120, so the merchant can store the token for use in the future. In the case of the low value token, the low value token may be a 24-hour or a one-time use token, whichever comes first. When the merchant system 120 transmits the stored high value token to the transaction processor 130, the transaction processor 130 may detokenize the high value token into a suitable format (e.g., a PAN in clear text and/or a PIN in encrypted format) acceptable by the transaction system.

In some embodiments, the merchant system 120 may encrypt or tokenize the sensitive user data on its own instead of utilizing the embedded frames or tokenization service(s) 150. For example, the merchant system 120 may provide a PAN in clear text if the tokenization of the PAN is performed by the merchant system 120. Otherwise, the PAN in the clear may be tokenized into a high value or low value PAN by the transaction processor 130 before being transmitted for authorization. In some embodiments, if the merchant system 120 provides a PIN in the clear, the PIN in clear text may always be tokenized by the transaction processor 130 before being transmitted for authorization. That is, the transaction processor 130 may provide, for example, a low value token for the received PIN in clear text to the merchant system 120 in order to proceed to perform purchase transactions with the transaction system (e.g., EBT payment network).

FIG. 4 depicts a flowchart of an exemplary method for performing an electronic transaction using a hosted transaction page, according to one aspect of the present disclosure. In particular, method 400 may be performed by the transaction processor 130 (e.g., the transaction processor 140 and the tokenization service(s) 150 thereof).

At step 402, the transaction processor 130 may provide a hosted transaction page to a first data system, the hosted transaction page enabling the first data system to request a secure electronic transaction. The first data system may be a merchant system. The hosted transaction page may include embedded frames. The secure electronic transaction requested by the first data system may be an EBT transaction, credit card transaction, or any other e-commerce related transaction.

At step 404, the transaction processor 130 may receive, on the hosted transaction page, authentication data from a user. The authentication data may include sensitive user data, for example, a PAN, a PIN, a credit card number, account information, a social security number, etc., or other sensitive personal or financial data. At step 406, upon receiving the authentication data, the transaction processor 130 may encode the authentication data into a first format. The authentication data may be encoded by the transaction processor 130 by encrypting the authentication data entered into an embedded frame using a JavaScript. In one embodiment, the authentication data in the first format may be RSA/ECB/PKSC1 Padding 2048 bits with a 24-hour public-private key pair known only by the transaction processor 130.

At step 408, the transaction processor 130 may tokenize the authentication data in the first format into tokenized authentication data. The transaction processor 130 may tokenize the authentication data into a low value token value or a high value token. The tokenized authentication data may have an expiration date. At step 410, the transaction processor 130 may transmit the tokenized authentication data to the first data system. The transmitted tokenized data may be displayed in the embedded frames of the hosted transaction page. Upon receiving a transaction confirmation on the hosted transaction page from a user, the first data system may transmit the tokenized authentication data back to the transaction processor 130 with an authorization request.

At step 412, the transaction processor 130 may receive, from the first data system, an authorization request for performing the secure electronic transaction based on the tokenized authentication data. The transaction processor 130 may detokenize the tokenized authentication data into the authentication data in the first format and/or into a second format. The authentication data is tokenized and/or detokenized by a tokenization service. The transaction processor 130 may transmit the detokenized authentication data to a second data system. At step 414, the transaction processor 130 may transmit the authorization request to a second data system. The second data system may include one or more payment systems or networks (e.g., Electronic Benefits Transfer (EBT) systems or networks, issuer systems or networks, acquirer systems or networks, etc.).

In one embodiment, the authorization request transmitted to the second data system may include the authentication data in the first format and the authentication value in a second format. The first format may include an authentication data in clear text (e.g., a PAN in clear text) and the second format may include an encrypted authentication value (e.g., an encrypted PIN). The second data system may perform an authorization process to generate and transmit an authorization response to the transaction processor 130. The transaction processor 130 may receive the authorization response indicating an authentication result from the second data system. The transaction processor 130 may then transmit the authorization response to the first data system.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 5:
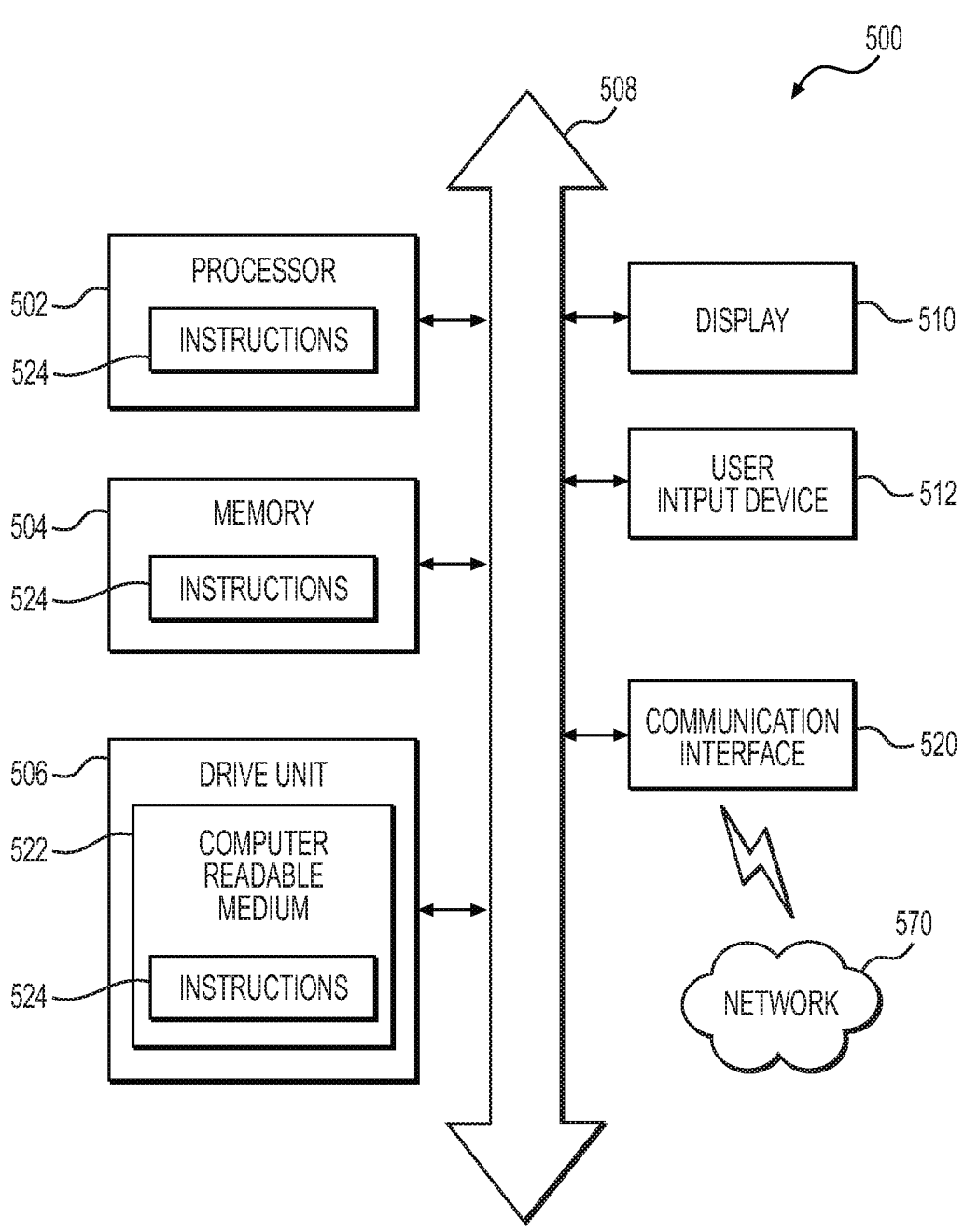
FIG. 5 illustrates a computer system that may execute the techniques described herein.

FIG. 5 illustrates a computer system designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 can be implemented using electronic devices that provide voice, video, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 500 may further include a display unit 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input device 512 configured to allow a user to interact with any of the components of system 500. The input device 512 may be a number pad, a keyboard, or a cursor control device, such as a mouse, or a joystick, touch screen display, remote control, or any other device operative to interact with the computer system 500.

The computer system 500 may also or alternatively include a disk or optical drive unit 506. The disk drive unit 506 may include a computer-readable medium 522 in which one or more sets of instructions 524, e.g., software, can be embedded. Further, the instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, a computer-readable medium 522 includes instructions 524 or receives and executes instructions 524 responsive to a propagated signal so that a device connected to a network 570 can communicate voice, video, audio, images, or any other data over the network 570. Further, the instructions 524 may be transmitted or received over the network 570 via a communication port or interface 520, and/or using a bus 508. The communication port or interface 520 may be a part of the processor 502 or may be a separate component. The communication port 520 may be created in software or may be a physical connection in hardware. The communication port 520 may be configured to connect with a network 570, external media, the display 510, or any other components in system 500, or combinations thereof. The connection with the network 570 may be a physical connection, such as a wired Ethernet connection or may be established wirelessly as discussed below. Likewise, the additional connections with other components of the system 500 may be physical connections or may be established wirelessly. The network 570 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 500 may be connected to one or more networks 570. The network 570 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 570 may include wide area networks (WAN), such as the Internet, local area networks (LAN), campus area networks, metropolitan area networks, a direct connection such as through a Universal Serial Bus (USB) port, or any other networks that may allow for data communication. The network 570 may be configured to couple one computing device to another computing device to enable communication of data between the devices. The network 570 may generally be enabled to employ any form of machine-readable media for communicating information from one device to another. The network 570 may include communication methods by which information may travel between computing devices. The network 570 may be divided into sub-networks. The sub-networks may allow access to all of the other components connected thereto or the sub-networks may restrict access between the components. The network 570 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method for performing an electronic transaction using a hosted transaction page, comprising:
  providing the hosted transaction page to a first data system, the hosted transaction page enabling the first data system to request an electronic transaction;
  receiving, via embedded frames of the hosted transaction page, authentication data from a user;
  upon receiving the authentication data, encoding the authentication data into a first format by the embedded frames of the hosted transaction page executing a programming language on the authentication data, wherein the first format is an encrypted format;
  validating the encoded authentication data in the first format and tokenizing the encoded authentication data in the first format into tokenized authentication data, wherein the tokenized authentication data is a low value token usable for a pre-determined amount of time or a high value token usable for recurring transactions;
  transmitting the tokenized authentication data to the first data system;
  receiving, from the first data system, an authorization request for performing the electronic transaction based on the tokenized authentication data; and
  transmitting the authorization request to a second data system.

2. The method of claim 1, further comprising:
  detokenizing the tokenized authentication data into the authentication data in the first format; and
  transmitting the authentication data in the first format to the second data system.

3. The method of claim 2, further comprising:
  receiving an authorization response, generated based on the authentication data in the first format, from the second data system; and
  transmitting the authorization response to the first data system.

4. The method of claim 1, wherein the embedded frame is configured to load and display content independent of the hosted transaction page.

5. The method of claim 1, wherein the authentication data includes at least one of: a personal identification number and a personal account number.

6. The method of claim 1, wherein the second data system comprises an Electronic Benefits Transfer (EBT) payment network.

7. A system comprising:
  one or more computer readable media storing instructions for performing an electronic transaction using a hosted transaction page; and
  one or more processors configured to execute the instructions to perform operations comprising:
    providing the hosted transaction page to a first data system, the hosted transaction page enabling the first data system to request an electronic transaction;
    receiving, via embedded frames of the hosted transaction page, authentication data from a user;
    upon receiving the authentication data, encoding the authentication data into a first format by the embedded frames of the hosted transaction page executing a programming language on the authentication data, wherein the first format is an encrypted format;
    validating the encoded authentication data in the first format and tokenizing the encoded authentication data in the first format into tokenized authentication data, wherein the tokenized authentication data is a low value token usable for a pre-determined amount of time or a high value token usable for recurring transactions;
    transmitting the tokenized authentication data to the first data system;
    receiving, from the first data system, an authorization request for performing the electronic transaction based on the tokenized authentication data; and
    transmitting the authorization request to a second data system.

8. The system of claim 7, the operations further comprising:
  detokenizing the tokenized authentication data into the authentication data in the first format; and
  transmitting the authentication data in the first format to the second data system.

9. The system of claim 8, the operations further comprising:
  receiving an authorization response, generated based on the authentication data in the first format, from the second data system; and
  transmitting the authorization response to the first data system.

10. The system of claim 7, wherein the embedded frame is configured to load and display content independent of the hosted transaction page.

11. The system of claim 7, wherein the authentication data includes at least one of: a personal identification number and a personal account number.

12. The system of claim 7, wherein the second data system comprises an Electronic Benefits Transfer (EBT) payment network.

13. A non-transitory computer-readable medium storing instructions for performing an electronic transaction using a hosted transaction page, the instructions, when executed by one or more processors, causing the one or more processors to perform operations comprising:

providing the hosted transaction page to a first data system, the hosted transaction page enabling the first data system to request an electronic transaction;

receiving, via embedded frames of the hosted transaction page, authentication data from a user;

upon receiving the authentication data, encoding the authentication data into a first format by the embedded frames of the hosted transaction page executing a programming language on the authentication data, wherein the first format is an encrypted format;

validating the encoded authentication data in the first format and tokenizing the encoded authentication data in the first format into tokenized authentication data, wherein the tokenized authentication data is a low value token usable for a pre-determined amount of time or a high value token usable for recurring transactions;

transmitting the tokenized authentication data to the first data system;

receiving, from the first data system, an authorization request for performing the electronic transaction based on the tokenized authentication data; and transmitting the authorization request to a second data system.

14. The non-transitory computer-readable medium of claim 13, the operations further comprising:

detokenizing the tokenized authentication data into the authentication data in the first format; and transmitting the authentication data in the first format to the second data system.

15. The non-transitory computer-readable medium of claim 14, the operations further comprising:

receiving an authorization response, generated based on the authentication data in the first format, from the second data system; and transmitting the authorization response to the first data system.

16. The non-transitory computer-readable medium of claim 13, wherein the embedded frame is configured to load and display content independent of the hosted transaction page.

17. The non-transitory computer-readable medium of claim 13, wherein the authentication data includes at least one of: a personal identification number and a personal account number.

18. The method of claim 1, wherein one or more fields in the embedded frames receiving the authentication data are masked with encrypted data before displaying to the user for confirmation of the electronic transaction, and wherein the authentication data includes sensitive user data for validating the electronic transaction.

19. The method of claim 1, further comprising:

verifying the tokenized authentication data by comparing the tokenized authentication data with a stored tokenized data.

20. The method of claim 1, wherein the tokenized authentication data is unique per electronic transaction, and wherein the tokenized authentication data is a pseudorandom number or a character sequence.

* * * * *